US011305495B2

(12) United States Patent
Takagi et al.

(10) Patent No.: US 11,305,495 B2
(45) Date of Patent: Apr. 19, 2022

(54) ADHESIVE INJECTION METHOD AND STRUCTURE

(71) Applicant: MITSUBISHI HEAVY INDUSTRIES, LTD., Tokyo (JP)

(72) Inventors: Kiyoka Takagi, Tokyo (JP); Jun Ishida, Tokyo (JP); Sota Kamo, Tokyo (JP); Katsuya Yoshino, Tokyo (JP); Tetsuya Kato, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 84 days.

(21) Appl. No.: 16/332,155

(22) PCT Filed: Oct. 16, 2017

(86) PCT No.: PCT/JP2017/037419
§ 371 (c)(1),
(2) Date: Mar. 11, 2019

(87) PCT Pub. No.: WO2018/096836
PCT Pub. Date: May 31, 2018

(65) Prior Publication Data
US 2019/0202139 A1  Jul. 4, 2019

(30) Foreign Application Priority Data
Nov. 22, 2016  (JP) .............................. JP2016-226998

(51) Int. Cl.
*B29C 65/54* (2006.01)
*B29C 65/00* (2006.01)
(Continued)

(52) U.S. Cl.
CPC .......... *B29C 65/542* (2013.01); *B29C 66/112* (2013.01); *B29C 66/1122* (2013.01);
(Continued)

(58) Field of Classification Search
CPC ....... Y10T 428/24339; Y10T 442/3667; B29C 66/342; B29C 66/7394; B29C 66/112;
(Continued)

(56) References Cited

U.S. PATENT DOCUMENTS 3,532,316 A   10/1970  Mathes
5,229,204 A   7/1993  Labock
(Continued)

FOREIGN PATENT DOCUMENTS

DE   102015002262   8/2015
JP   7-507383        8/1995
(Continued)

OTHER PUBLICATIONS

Notice of Reasons for Refusal dated May 19, 2020 in corresponding Japanese Patent Application No. 2016-226998, with Machine translation.
(Continued)

*Primary Examiner* — Jacob T Minskey
*Assistant Examiner* — S. Behrooz Ghorishi
(74) *Attorney, Agent, or Firm* — Wenderoth, Lind & Ponack, L.L.P.

(57) ABSTRACT

An adhesive injection method is for injecting an adhesive that bonds an outer plate and a reinforcing member. The reinforcing member has through holes bored through the reinforcing member in a direction intersecting a bonding surface facing the outer plate. The method includes positioning the outer plate and the reinforcing member; disposing a sealing material covering a gap between the outer plate and the reinforcing member; and injecting the adhesive into the through holes in order from one end to the other end of the bonding surface. At the injecting, while the adhesive is injected into the through hole, when the adhesive is recognized through another through hole formed adjacent to the
(Continued)

through hole into which the adhesive is being injected, a through hole into which the adhesive is to be injected is shifted from the through hole into which the adhesive is being injected to the other through hole.

12 Claims, 10 Drawing Sheets

(51) Int. Cl.
  *B29C 70/02* (2006.01)
  *B29C 45/14* (2006.01)
  *B29C 65/60* (2006.01)
(52) U.S. Cl.
  CPC .......... *B29C 66/131* (2013.01); *B29C 66/342* (2013.01); *B29C 66/43441* (2013.01); *B29C 66/532* (2013.01); *B29C 66/721* (2013.01); *B29C 66/7392* (2013.01); *B29C 66/7394* (2013.01); *B29C 70/02* (2013.01); *B29C 45/14344* (2013.01); *B29C 65/544* (2013.01); *B29C 65/605* (2013.01)
(58) Field of Classification Search
  CPC ............ B29C 66/43441; B29C 66/131; B29C 66/532; B29C 66/7392; B29C 66/1122; B29C 66/721; B29C 45/14344; B29C 65/605; B29C 65/544; B29C 65/542; B29C 70/02; B29D 2030/0698
  See application file for complete search history.

(56) References Cited

U.S. PATENT DOCUMENTS

| | | | | |
|---|---|---|---|---|
| 2003/0170422 | A1* | 9/2003 | Heta | B29C 65/70 428/137 |
| 2006/0243382 | A1* | 11/2006 | Kilwin | B29C 65/544 156/285 |
| 2012/0279560 | A1* | 11/2012 | Sumida | H01L 31/042 136/251 |
| 2014/0241790 | A1* | 8/2014 | Woleader | B29C 66/12441 403/270 |
| 2014/0346179 | A1* | 11/2014 | Bailly | B29C 65/483 220/564 |

FOREIGN PATENT DOCUMENTS

| | | |
|---|---|---|
| JP | 2003-11231 | 1/2003 |
| JP | 2012-220023 | 11/2012 |

OTHER PUBLICATIONS

International Search Report dated Nov. 21, 2017 in International (PCT) Application No. PCT/JP2017/037419.
Extended European Search Report dated Jul. 31, 2019 in corresponding European Patent Application No. 17873987.6.

* cited by examiner

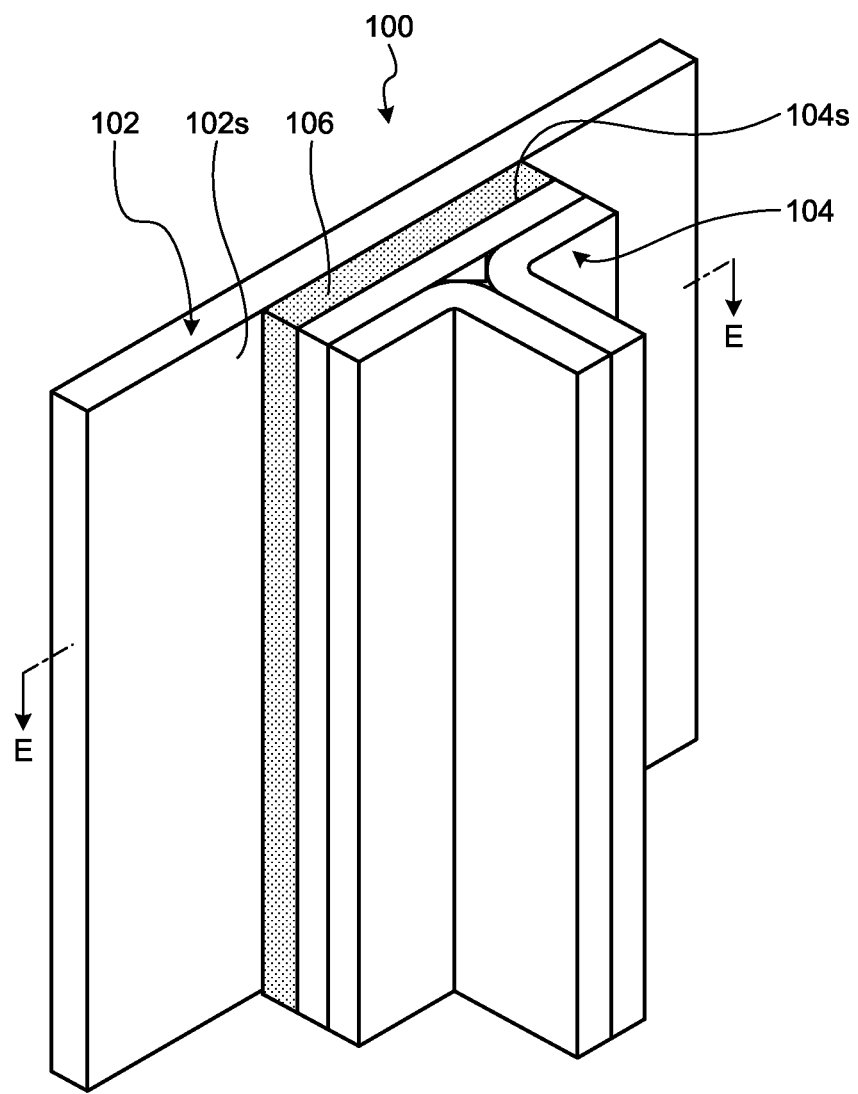
FIG.11 - PRIOR ART

FIG.12 - PRIOR ART
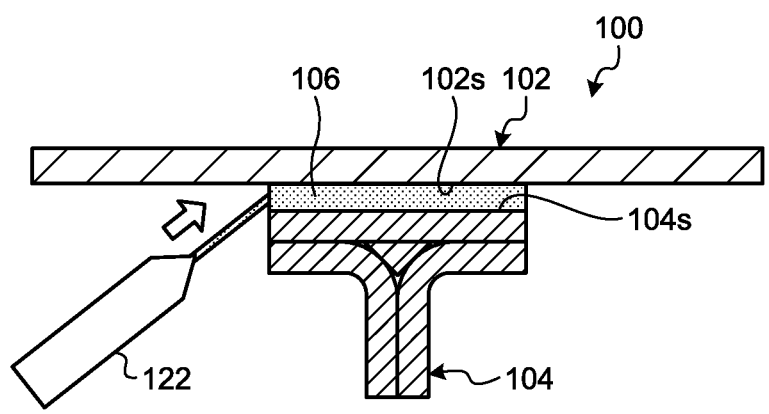
FIG.13 - PRIOR ART
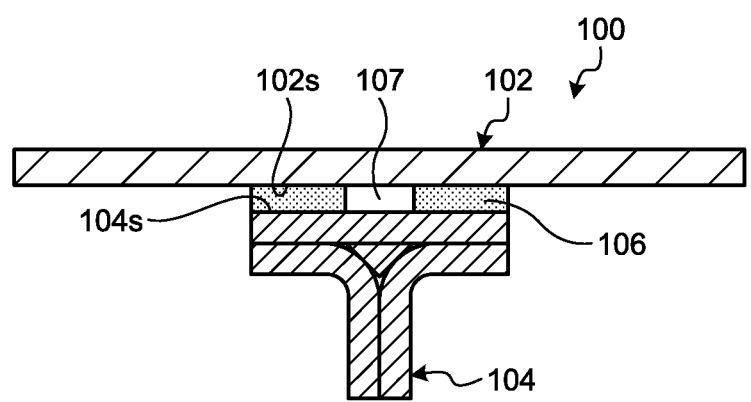

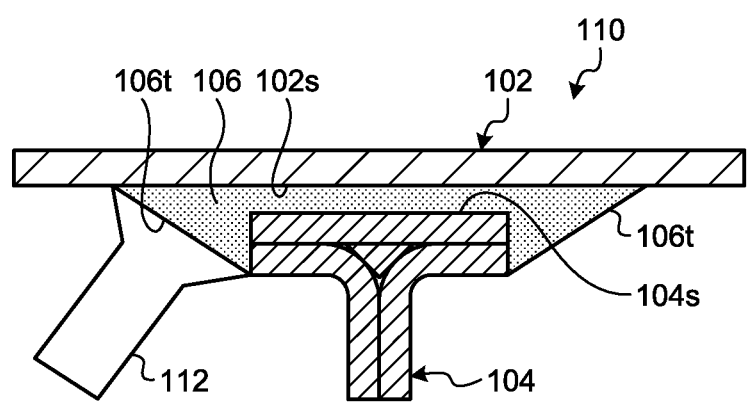
FIG.14 - PRIOR ART ics and ships, for example.
ADHESIVE INJECTION METHOD AND STRUCTURE

FIELD

The present invention relates to a method for injecting an adhesive and a structure manufactured by injecting the adhesive.

BACKGROUND

Various kinds of materials having a light weight and high strength are known, including composite materials obtained by impregnating reinforcing fibers with a resin. Composite materials are used for aircrafts, cars, and ships, for example. Composite materials are bonded to other composite materials and used as structures. Various methods for bonding a plurality of composite materials are known, including methods of applying an adhesive between a plurality of composite materials to be bonded (refer to Japanese Patent Application Laid-open No. 2003-011231 and Japanese Patent Application Laid-open No. 2012-220023).

FIG. 10 is a schematic of a conventional structure 100 of composite materials. FIG. 11 is an enlarged schematic of the conventional structure 100 of the composite materials. FIG. 12 is a sectional schematic of an example of one state in a method for injecting an adhesive in manufacturing the conventional structure 100 of the composite materials. FIG. 13 is a sectional schematic of the conventional structure 100 of the composite materials. FIG. 11 is an enlarged view of an area D in FIG. 10. FIGS. 12 and 13 are sectional views viewed from the E-E section in FIG. 11.

As illustrated in FIGS. 10 and 11, the conventional structure 100 of the composite materials includes an outer plate 102, a reinforcing member 104, and an adhesive 106. As illustrated in FIG. 11, to a bonded surface 102s of the outer plate 102, a bonding surface 104s of the reinforcing member 104 is bonded with the adhesive 106 interposed therebetween. The bonding surface 104s of the reinforcing member 104 is bonded to the bonded surface 102s of the outer plate 102 with the adhesive 106 interposed therebetween. The adhesive 106 is provided to an area between the bonded surface 102s of the outer plate 102 and the bonding surface 104s of the reinforcing member 104 to bond the bonded surface 102s of the outer plate 102 and the bonding surface 104s of the reinforcing member 104.

If the outer plate 102 and the reinforcing member 104 need to be precisely positioned in the structure 100 of the composite materials, it is necessary to bond the outer plate 102 and the reinforcing member 104 by positioning the outer plate 102 and the reinforcing member 104 in advance and injecting the liquid adhesive 106 using an adhesive injector 122 from a gap between the bonded surface 102s of the outer plate 102 and the bonding surface 104s of the reinforcing member 104 into the area therebetween as illustrated in FIG. 12. In the following description, the area between the bonded surface 102s of the outer plate 102 and the bonding surface 104s of the reinforcing member 104 is referred to as an adhesive injection area. In the following description, the gap between the bonded surface 102s of the outer plate 102 and the bonding surface 104s of the reinforcing member 104 is simply referred to as a gap. In the conventional structure 100 of the composite materials, it cannot be checked whether air bubbles remain in the adhesive injection area when the liquid adhesive 106 is injected from the gap. As a result, the adhesive 106 includes an air bubble 107 as illustrated in FIG. 13, thereby reducing the bonding strength between the outer plate 102 and the reinforcing member 104.

FIG. 14 is a sectional schematic of another example of one state in the method for injecting the adhesive in manufacturing a conventional structure 110 of the composite materials. In the conventional structure 110 of the composite materials, as illustrated in FIG. 14, the adhesive 106 additionally includes tapered portions 106t formed in a tapered shape extending from the reinforcing member 104 to the outer plate 102 at gap portions. If the gap portions of the adhesive 106 need to have resistance to external stress in the structure of the composite materials, it is necessary to form the tapered portions 106t at the gap portions of the injected adhesive 106 using a taper former 112, such as a taper-forming spatula, like the structure 110 of the composite material. In the conventional structure 110 of the composite materials, it cannot be checked whether air bubbles remain in the adhesive injection area when the liquid adhesive 106 is injected from the gap. As a result, the adhesive 106 includes air bubbles similarly to the conventional structure 100 of the composite materials, thereby reducing the bonding strength between the outer plate 102 and the reinforcing member 104.

As described above, in both cases of manufacturing the conventional structure 100 of the composite materials illustrated in FIG. 13 and manufacturing the conventional structure 110 of the composite materials illustrated in FIG. 14, it cannot be checked whether air bubbles remain in the adhesive injection area when the liquid adhesive 106 is injected from the gap. As a result, the adhesive 106 includes air bubbles, thereby reducing the bonding strength between the outer plate 102 and the reinforcing member 104.

In view of the disadvantages described above, the present invention has an object to provide a method for injecting an adhesive and a structure that enable checking that no air bubble remains in an adhesive injection area when the adhesive is injected, reducing the number of air bubbles included in the adhesive, and suppressing reduction in the bonding strength between composite materials.

SUMMARY OF THE INVENTION

To solve the problems described above and achieve the object, an adhesive injection method is a method for injecting an adhesive that bonds an outer plate and a reinforcing member. The reinforcing member has a plurality of through holes bored through the reinforcing member in a direction intersecting a bonding surface facing the outer plate. The adhesive injection method includes a positioning step of positioning the outer plate and the reinforcing member; a sealing material disposing step of disposing a sealing material that covers a gap between the outer plate and the reinforcing member; and an injecting step of injecting the adhesive into the through holes in order from one end to the other end of the bonding surface. At the injecting step, while the adhesive is injected into the through hole, when the adhesive is recognized through another through hole formed adjacent to the through hole into which the adhesive is being injected, a through hole into which the adhesive is to be injected is shifted from the through hole into which the adhesive is being injected to the other through hole.

With this configuration, the adhesive is injected into and fills in the through holes of the reinforcing member. As a result, air bubbles are removed from the other end of the bonding surface, the gap, and the through holes into which the adhesive is not injected. The adhesive is checked from another through hole formed adjacent to the first through hole into which the adhesive is being injected. Consequently, the configuration enables checking that no air bubble remains in an adhesive injection area when the adhesive is injected, reducing the number of air bubbles included in the adhesive, and suppressing reduction in the bonding strength between the composite materials.

In this configuration, preferably, the sealing material forms the adhesive injected at the injecting step into a tapered shape tapering from the reinforcing member to the outer plate. This configuration can stabilize the quality of the portion formed in a tapered shape and increase the resistance to external stress at a gap portion of the adhesive. In addition, the configuration requires less work to form the adhesive into a tapered shape.

In the configuration in which the adhesive is formed into the tapered shape, preferably, the sealing material has flexibility and changes its shape in such a manner to swell toward an outside of the gap as the adhesive is injected at the injecting step. This configuration can form the gap portion of the adhesive into a desired tapered shape using shrinkage of the adhesive accompanying curing. The configuration can further stabilize the quality of the portion formed in a tapered shape.

In the configuration in which the adhesive is formed into the tapered shape, preferably, the sealing material is a dam member which is a rigid body and an inside of which is formed in a tapered shape tapering from the reinforcing member to the outer plate. This configuration can form the gap portion of the adhesive into a desired tapered shape corresponding to the inner shape of the dam member. The configuration can further stabilize the quality of the portion formed in a tapered shape.

In the configurations described above, preferably, the sealing material includes a plurality of divided sealing pieces, and at the sealing material disposing step, the sealing pieces are disposed in order from the one end to the other end of the bonding surface, and before the adhesive injected at the injecting step protrudes beyond a range of a previously disposed sealing piece, a sealing piece is additionally disposed. This configuration can maintain the state of being capable of removing air bubbles from the other end of the bonding surface corresponding to an injection state of the adhesive.

In the configurations described above, preferably, at the injecting step, suction is performed through the through hole formed adjacent to the through hole, and when the adhesive is recognized through the through hole formed adjacent to the through hole into which the adhesive is being injected, a through hole through which suction is to be performed is shifted from the through hole through which the suction is being performed to another through hole formed adjacent to the through hole through which the suction is being performed. With this configuration, air bubbles are removed by the suction. Consequently, the configuration enables further reducing the number of air bubbles included in the adhesive and suppressing reduction in the bonding strength between the composite materials.

In the configurations described above, preferably, at the injecting step, a lid member is attached to the through hole on which injection of the adhesive is completed. This configuration can prevent the adhesive from leaking from the through hole on which injection of the adhesive is completed.

In the configuration in which the lid member is attached, preferably, the lid member includes a lid body that covers the through hole; a protrusion extending in a protruding manner in a direction from the lid body toward the outer plate; and a stopper provided at a position of a predetermined length from a front end of the protrusion toward the lid body and that prevents the lid member from coming off from the through hole, and the lid member keeps the thickness of the adhesive at a length defined based on the predetermined length. This configuration can prevent the lid member from coming off from the through hole and keep the thickness of the adhesive at a length defined based on the predetermined length.

In the configurations described above, preferably, the bonding surface extends in a certain direction, the through holes are formed in a pair of two columns extending in the certain direction in a staggered manner, and the sealing material extends in the certain direction and covers the gap formed on both sides. This configuration requires the bonding surface with a smaller area and a smaller number of through holes and can increase the reinforcing effect of the reinforcing member.

In the configuration in which the bonding surface is formed to extend in a certain direction, preferably, the reinforcing member includes a flange extending in a direction along the bonding surface; and a web extending in a direction intersecting the bonding surface and in the certain direction, and the through holes are formed in a pair of two columns in a staggered manner with the web sandwiched therebetween. This configuration requires the bonding surface with a smaller area and a smaller number of through holes and can further increase the reinforcing effect of the reinforcing member.

To solve the problems described above and achieve the object, a structure includes an outer plate; a reinforcing member; and an adhesive that bonds the outer plate and the reinforcing member. The reinforcing member includes a plurality of through holes bored through the reinforcing member in a direction intersecting a bonding surface facing the outer plate, and the adhesive is injected into the through holes.

With this configuration, the adhesive is injected from the through holes of the reinforcing member. As a result, air bubbles are removed from the other end of the bonding surface, the gap, and the through holes into which the adhesive is not injected. The adhesive is checked through another through hole formed adjacent to the first through hole into which the adhesive is being injected. Consequently, the configuration enables checking that no air bubble remains in the adhesive injection area when the adhesive is injected, reducing the number of air bubbles included in the adhesive, and suppressing reduction in the bonding strength between the composite materials.

In this configuration, preferably, the adhesive is formed in a tapered shape tapering from the reinforcing member to the outer plate. This configuration can stabilize the quality of the portion formed in a tapered shape and increase the resistance to external stress at the gap portion of the adhesive. In addition, the configuration requires less work to form the adhesive in a tapered shape.

In the configurations described above, preferably, the structure further includes a lid member attached to the through hole, and the lid member includes a lid body that covers the through hole; a protrusion extending in a protruding manner in a direction from the lid body toward the outer plate; and a stopper provided at a position of a predetermined length from a front end of the protrusion toward the lid body and that prevents the lid member from coming off from the through hole. This configuration can prevent the adhesive from leaking from the through hole. Furthermore, the configuration can prevent the lid member from coming off from the through hole and keep the thickness of the adhesive at the predetermined length.

In the configurations described above, preferably, the bonding surface extends in a certain direction, and the through holes are formed in a pair of two columns extending in the certain direction in a staggered manner. This configuration requires the bonding surface with a smaller area and a smaller number of through holes and can increase the reinforcing effect of the reinforcing member.

In the configuration in which the bonding surface formed to extend in a certain direction, the reinforcing member includes a flange extending in a direction along the bonding surface; and a web extending in a direction intersecting the bonding surface and in the certain direction, and the through holes are formed in a pair of two columns in a staggered manner with the web sandwiched therebetween. This configuration requires the bonding surface with a smaller area and a smaller number of through holes and can further increase the reinforcing effect of the reinforcing member.

Advantageous Effects of Invention

The present invention can provide a method for injecting an adhesive and a structure that enable checking that no air bubble remains in an adhesive injection area when the adhesive is injected, reducing the number of air bubbles included in the adhesive, and suppressing reduction in the bonding strength between composite materials.

BRIEF DESCRIPTION OF DRAWINGS

FIG. 11 is an enlarged schematic of the conventional structure of the composite materials.

FIG. 12 is a sectional schematic of an example of one state in a method for injecting an adhesive in manufacturing the conventional structure of the composite materials.

FIG. 13 is a sectional schematic of the conventional structure of the composite materials.

FIG. 14 is a sectional schematic of another example of one state in the method for injecting the adhesive in manufacturing the conventional structure of the composite materials.

DESCRIPTION OF EMBODIMENTS

Embodiments according to the present invention will be described below in detail with reference to the accompanying drawings. The embodiments are not intended to limit the invention. Components according to the embodiments include components easily conceivable and replaceable by those skilled in the art and components substantially identical therewith. Furthermore, the components described below may be appropriately combined.

First Embodiment

Figure 1:
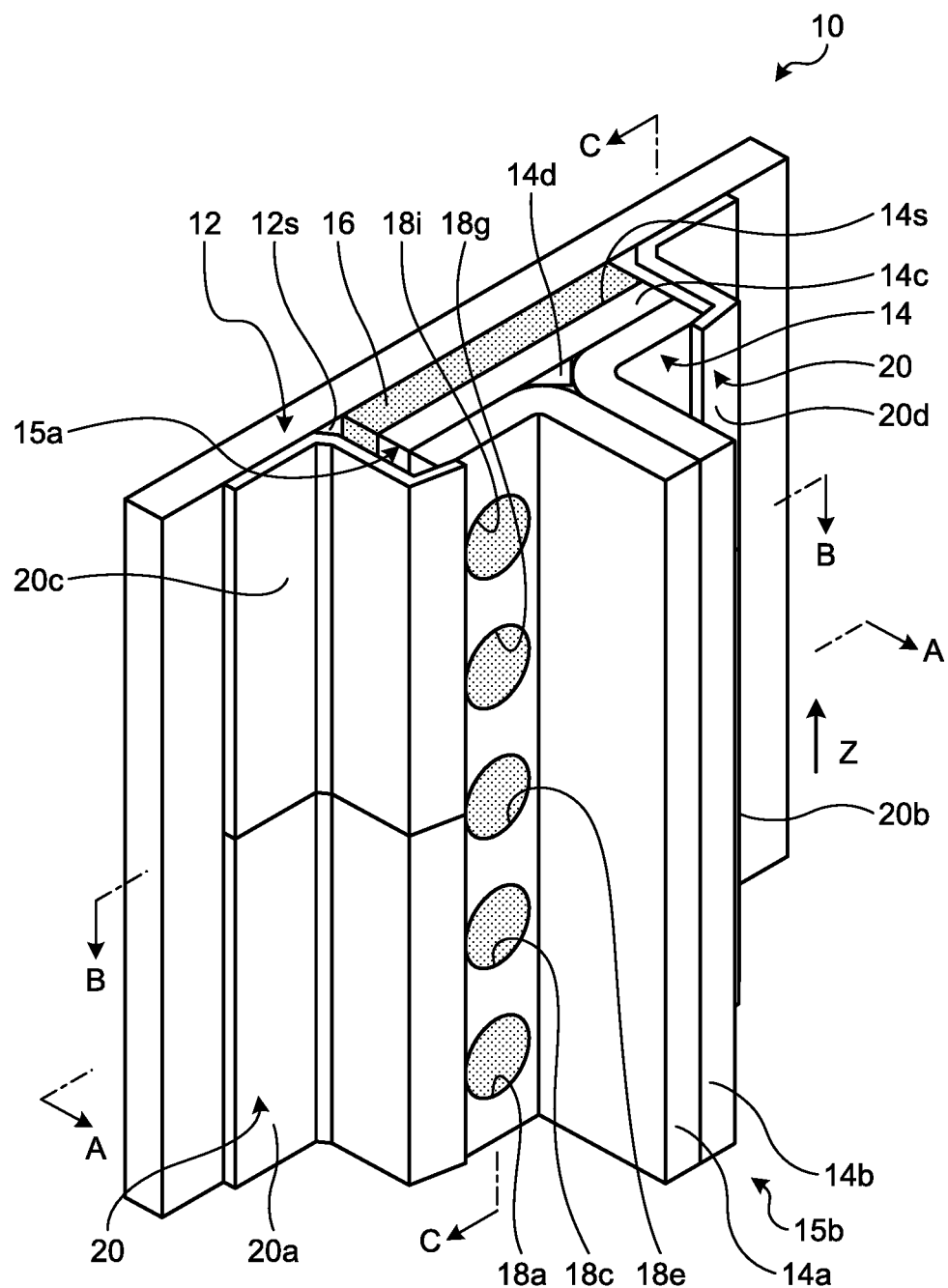
FIG. 1 is a schematic of a structure of composite materials according to a first embodiment.

FIG. 1 is a schematic of a structure 10 of composite materials according to a first embodiment. As illustrated in FIG. 1, the structure 10 of the composite materials includes an outer plate 12, a reinforcing member 14, and an adhesive 16. To a bonded surface 12s of the outer plate 12, a bonding surface 14s of the reinforcing member 14 is bonded with the adhesive 16 interposed therebetween. The bonding surface 14s of the reinforcing member 14 is bonded to the bonded surface 12s of the outer plate 12 with the adhesive 16 interposed therebetween. The outer plate 12 and the bonded surface 12s face the reinforcing member 14 and the bonding surface 14s in a direction orthogonal to the surfaces. In the present embodiment, a member to be reinforced is referred to as the outer plate 12, and a member that reinforces the member to be reinforced is referred to as the reinforcing member 14 for convenience of detailed explanation. The combination of members bonded by the adhesive 16 is not limited thereto and may include combinations of any members having shapes capable of being bonded. The adhesive 16 is provided to an area between the bonded surface 12s of the outer plate 12 and the bonding surface 14s of the reinforcing member 14 to bond the bonded surface 12s of the outer plate 12 and the bonding surface 14s of the reinforcing member 14. In the following description, the area provided with the adhesive 16 between the bonded surface 12s of the outer plate 12 and the bonding surface 14s of the reinforcing member 14 is referred to as an adhesive injection area.

The outer plate 12 is a plate of the composite material extending in a direction along a plane including the bonded surface 12s and includes the bonded surface 12s. The reinforcing member 14 is a T-shaped member extending in a longitudinal direction along the bonding surface 14s, that is, a Z-direction in FIG. 1. As illustrated in FIG. 1, the reinforcing member 14 includes a flange 15a and a web 15b. The flange 15a extends in a direction along the bonding surface 14s. The web 15b extends in a direction intersecting the bonding surface 14s and along the Z-direction. The reinforcing member 14 includes a first member 14a, a second member 14b, a third member 14c, and a fourth member 14d. The first and second members 14a and 14b are L-shaped members of the composite material extending along the Z-direction. The third member 14c is a plate of the composite material extending in a direction along a plane including the bonding surface 14s and includes the bonding surface 14s. The fourth member 14d is a triangular prismatic member of the composite material extending along the Z-direction.

A first outside surface of the first member 14a forming the L-shape is bonded to a second outside surface of the second member 14b forming the L-shape. A second outside surface of the first member 14a forming the L-shape is bonded to a first part of the third member 14c with respect to a center line along the Z-direction on the surface opposite to the bonding surface 14s. A first outside surface of the second member 14b forming the L-shape is bonded to a second part of the third member 14c with respect to the center line along the Z-direction on the surface opposite to the bonding surface 14s. The second outside surface of the second member 14b forming the L-shape is bonded to the first outside surface of the member 14a forming the L-shape. The first part of the third member 14c with respect to the center line along the Z-direction on the surface opposite to the bonding surface 14s is bonded to the second outside surface of the first member 14a forming the L-shape. The second part of the third member 14c with respect to the center line along the Z-direction on the surface opposite to the bonding surface 14s is bonded to the first outside surface of the second member 14b forming the L-shape. The fourth member 14d is disposed so as to fill a space formed by a curve on the outside surface of the first member 14a forming the L-shape, a curve on the outside surface of the second member 14b forming the L-shape, and a part of the third member 14c near the center line along the Z-direction on the surface opposite to the bonding surface 14s. The fourth member 14d is bonded to the members 14a, 14b, and 14c. The members 14a, 14b, 14c, and 14d may be bonded by curing of a resin included in the composite materials, which will be described later, or by the adhesive for bonding the composite materials.

The flange 15a includes a part of the first member 14a including the second surface forming the L-shape, a part of the second member 14b including the first surface forming the L-shape, and the third member 14c. The web 15b includes a part of the first member 14a including the first surface forming the L-shape and a part of the second member 14b including the second surface forming the L-shape.

The reinforcing member 14 includes a plurality of through holes bored therethrough in a direction intersecting the bonding surface 14s. The through holes are a through hole 18a, a through hole 18b, a through hole 18c, a through hole 18d, a through hole 18e, a through hole 18f, a through hole 18g, a through hole 18h, a through hole 18i, and a through hole 18j (refer to FIGS. 3 and 4 on the through holes 18b, 18d, 18f, 18h, and 18j). The through holes 18a to 18j are formed in this order from one end of the bonding surface 14s, that is, the end in the −Z-direction in FIG. 1 to the other end of the bonding surface 14s, that is, the end in the +Z-direction in FIG. 1.

Specifically, the through holes 18a to 18j are bored through the flange 15a included in the reinforcing member 14 in a direction orthogonal to the bonding surface 14s. More specifically, the through holes 18a, 18c, 18e, 18g, and 18i are bored through the part of the first member 14a including the second surface forming the L-shape and the third member 14c included in the reinforcing member 14, and are formed in a line in the direction along the Z-direction. The through holes 18b, 18d, 18f, 18h, and 18j are bored through the part of the second member 14b including the first surface forming the L-shape and the member 14c and are formed in a line in a direction along the Z-direction. In other words, the through holes 18a to 18j are formed in a pair of two columns in a staggered manner with the web 15b sandwiched therebetween from the end in the −Z-direction to the end in the +Z-direction in the flange 15a.

The through holes 18a to 18j are formed side by side successively from the end in the −Z-direction to the end in the +Z-direction. In other words, the through hole 18a and the through hole 18b are formed adjacent to each other, the through hole 18b and the through hole 18c are formed adjacent to each other, the through hole 18c and the through hole 18d are formed adjacent to each other, the through hole 18d and the through hole 18e are formed adjacent to each other, the through hole 18e and the through hole 18f are formed adjacent to each other, the through hole 18f and the through hole 18g are formed adjacent to each other, the through hole 18g and the through hole 18h are formed adjacent to each other, the through hole 18h and the through hole 18i are formed adjacent to each other, and the through hole 18i and the through hole 18j are formed adjacent to each other.

The adhesive 16 is injected into and fills in the through holes 18a to 18j. The adhesive 16 injected into and filling in the through holes 18a to 18j are integrated with the adhesive 16 in the adhesive injection area.

The composite materials used for the structure 10, the outer plate 12, and the reinforcing member 14 are materials used for aircrafts, cars, and ships, for example. The composite materials include reinforcing fibers that reinforce the composite material and a resin impregnated into the reinforcing fibers, for example. The reinforcing fiber is a bundle of the order of several hundred to several thousand base fibers in a range of equal to or larger than 5 μm and equal to or smaller than 7 μm, for example. The base fibers constituting the reinforcing fibers are carbon fibers, for example. The base fibers constituting the reinforcing fibers are not limited thereto and may be other plastic fibers, glass fibers, or metal fibers, for example. While the resin impregnated into the reinforcing fibers is preferably a thermosetting resin, it may be a thermoplastic resin. Examples of the thermosetting resin include, but are not limited to, epoxy resin, etc. Examples of the thermoplastic resin include, but are not limited to, polyetheretherketone (PEEK), polyetherketoneketone (PEKK), polyphenylenesulfide (PPS), etc. The resin impregnated into the reinforcing fibers is not limited thereto and may be other resins.

The adhesive 16 may be any kind of adhesive as long as it can bond the composite materials. The adhesive 16 is preferably integrated with the composite materials and include the resin used for the composite materials, for example. The use of the resin can increase the bonding strength between the composite materials.

The structure 10 has a gap between the bonded surface 12s of the outer plate 12 and the bonding surface 14s of the reinforcing member 14. Through the gap, the adhesive 16 is exposed from the outer plate 12 and the reinforcing member 14. In the following description, the gap between the bonded surface 12s of the outer plate 12 and the bonding surface 14s of the reinforcing member 14 is simply referred to as a gap. The gaps extend in the Z-direction on both sides of the bonding surface 14s because the outer plate 12 and the reinforcing member 14 of the structure 10 extend in the Z-direction.

The structure 10 may include a sealing material (i.e., a seal) 20 that covers the gaps formed on both (opposite) sides of the bonding surface 14s. The sealing material (seal) 20 is a discrete element with respect to the adhesive (i.e., is not simply a portion of the adhesive), and is disposed in a method of injecting the adhesive 16, which will be described later. One side of the sealing material (seal) 20 is fixed to the reinforcing member 14, and the other side thereof is fixed to the outer plate 12, thereby covering the gap. As illustrated in FIG. 1, the sealing material (seal) 20 includes a plurality of divided pieces, that is, a sealing piece (first seal member) 20a, a sealing piece (second seal member) 20b, a sealing piece (third seal member) 20c, and a sealing piece (fourth seal member) 20d. The sealing material 20 and the sealing pieces 20a to 20d may be tape-like members made of a flexible material or dam members made of a rigid material.

One side of each of the sealing pieces 20a and 20c is fixed to the part of the member 14a of the reinforcing member 14 including the second surface forming the L-shape without covering the through holes 18a, 18c, 18e, 18g, and 18i. The sealing piece 20a and the sealing piece 20c are disposed in this order from the end in the −Z-direction to the end in the +Z-direction. The sealing pieces 20a and 20c cover the gap formed on one side and can be connected to and separated from each other. The first sides of the sealing pieces 20b and 20d are fixed to the part of the member 14b of the reinforcing member 14 including the first surface forming the L-shape without covering the through holes 18b, 18d, 18f, 18h, and 18j. The sealing piece 20b and the sealing piece 20d are disposed in this order from the end in the −Z-direction to the end in the +Z-direction. The sealing pieces 20b and 20d cover the gap formed on the other side and can be connected to and separated from each other.

The structure 10 has the configuration described above. Because the adhesive 16 is injected into and fills in the through holes 18a to 18j of the reinforcing member 14, air bubbles are removed from the end in the +Z-direction corresponding to the other end of the bonding surface 14s, the gaps, and the through holes into which the adhesive 16 is not injected. The adhesive 16 is checked through an adjacent second one of the through holes formed adjacent to a first through hole into which the adhesive 16 is being injected. Consequently, the structure 10 enables checking that no air bubble remains in the adhesive injection area when the adhesive 16 is injected, reducing the number of air bubbles included in the adhesive 16, and suppressing reduction in the bonding strength between the composite materials.

In the structure 10, the bonding surface 14s extends in the Z-direction, and the through holes 18a to 18j are formed in a pair of two columns extending in the Z-direction in a staggered manner. Consequently, the structure 10 requires the bonding surface 14s with a smaller area and a smaller number of through holes 18a to 18j and can increase the reinforcing effect of the reinforcing member 14.

In the structure 10, the through holes 18a to 18j are formed in a pair of two columns extending in the Z-direction in a staggered manner with the web 15b sandwiched therebetween in the flange 15a. Consequently, the structure 10 requires the bonding surface 14s with a smaller area and a smaller number of through holes 18a to 18j and can increase the reinforcing effect of the reinforcing member 14.

Because the structure 10 includes the sealing material (seal) 20 that covers the gaps, it can protect gap portions of the adhesive 16 from the outside. In the structure 10, the sealing material 20 that covers the gaps includes a plurality of divided pieces, that is, the sealing pieces 20a, 20b, 20c, and 20d. With this configuration, appropriate replacement of the sealing pieces 20a, 20b, 20c, and 20d can suitably protect the gap portions of the adhesive 16 from the outside.

The sealing material (seal) does not necessarily have the structure of the sealing material 20 described above and may extend toward the through holes 18a to 18j. This structure is preferably employed because the through holes 18a to 18j can be covered with the part of the sealing material extending toward the through holes 18a to 18j after the adhesive 16 is injected thereinto.

The sealing material (seal) may have through holes. The through holes may be formed at desired positions in the sealing material or at the boundaries between the sealing pieces constituting the sealing material, for example. In this case, the through holes formed in the reinforcing member 14 and the through holes formed in the sealing material (seal) 20 are successively used to remove air bubbles, check that no air bubble remains, and inject the adhesive 16. Consequently, this structure requires a smaller number of through holes formed in the reinforcing member 14, thereby further increasing the reinforcing effect of the reinforcing member 14. Alternatively, the sealing material (seal) may have through holes, and the reinforcing member 14 may have no through hole. Also in this case, the through holes formed in the sealing material are successively used to remove air bubbles, check that no air bubble remains, and inject the adhesive 16. Consequently, this structure requires no through hole formed in the reinforcing member 14, thereby further increasing the reinforcing effect of the reinforcing member 14.

Figure 2:
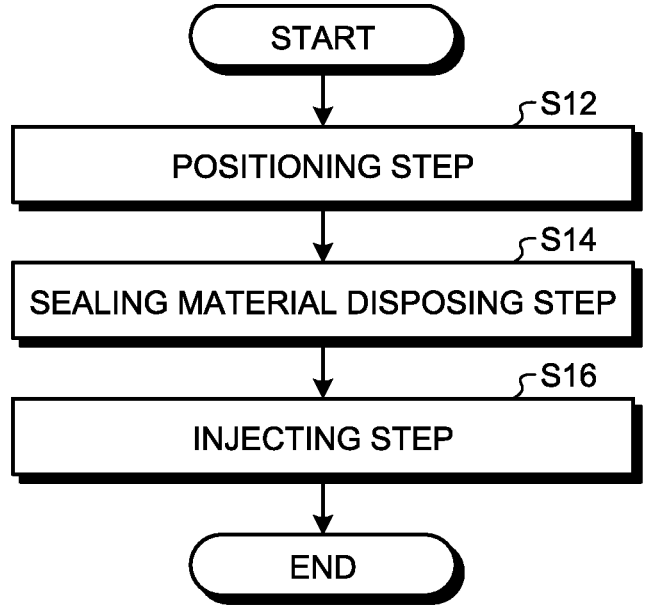
FIG. 2 is a flowchart of a method for injecting an adhesive according to the first embodiment.
Figure 3:
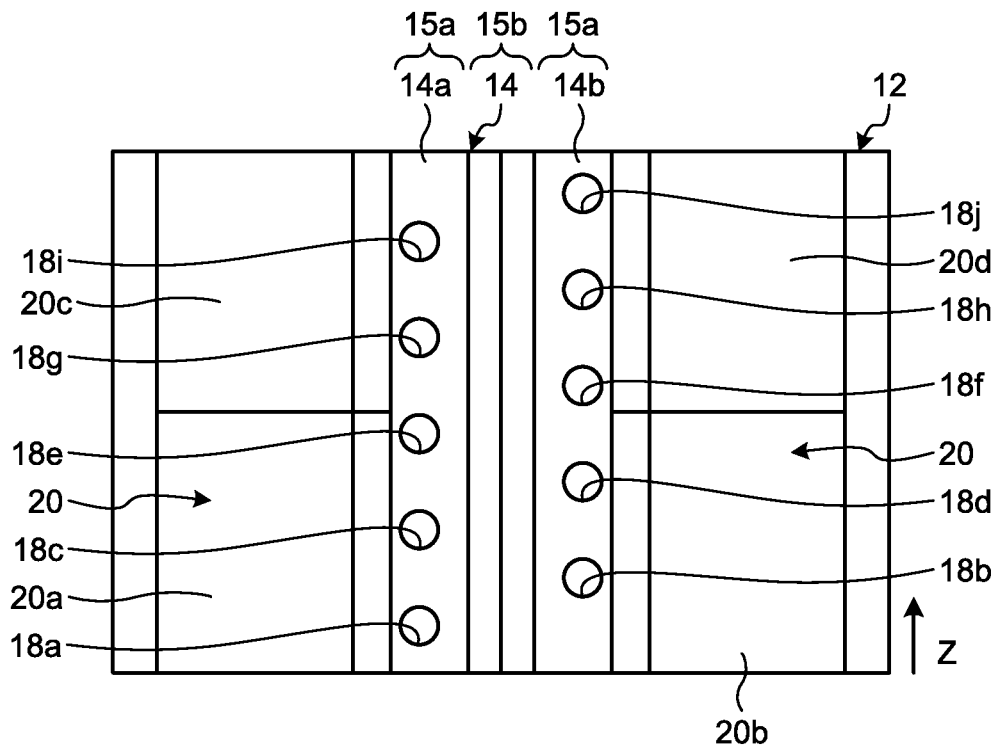
FIG. 3 is a schematic configuration diagram of one state in the method for injecting the adhesive according to the first embodiment.
Figure 4:
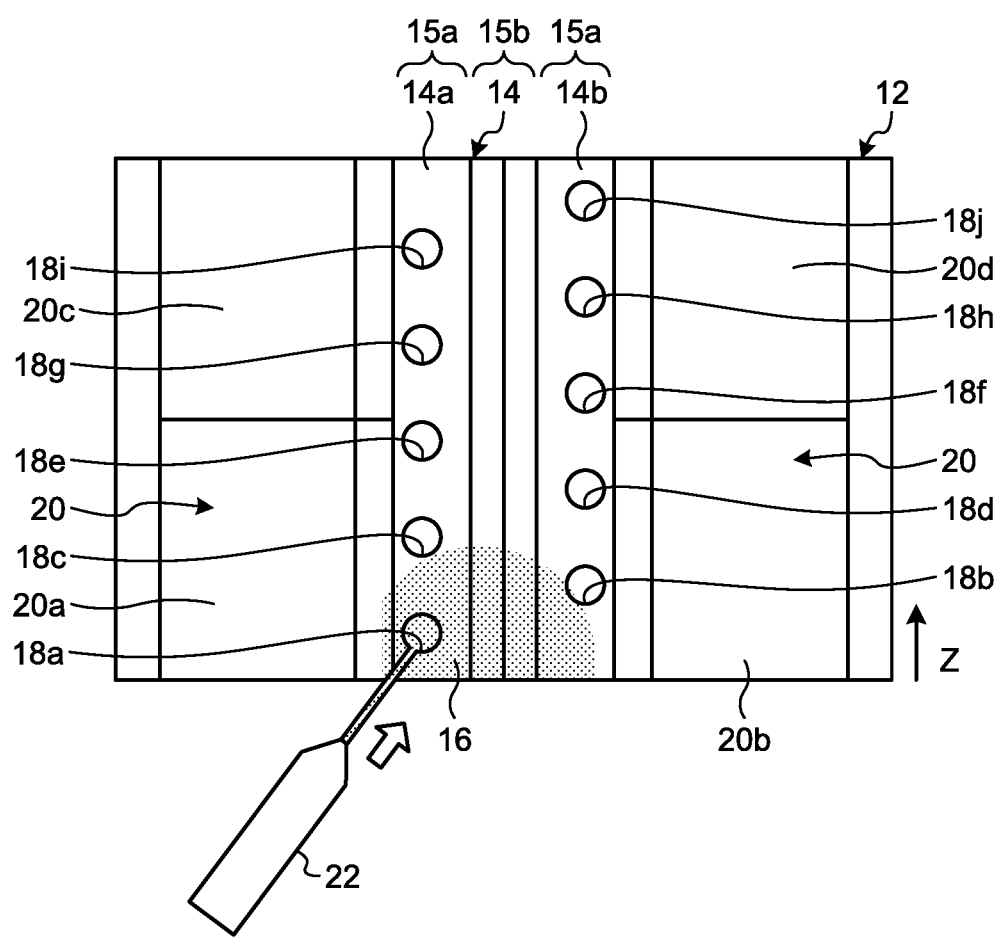
FIG. 4 is a schematic configuration diagram of another state in the method for injecting the adhesive according to the first embodiment.

FIG. 2 is a flowchart of the method for injecting the adhesive 16 according to the first embodiment. FIG. 3 is a schematic configuration diagram of one state in the method for injecting the adhesive 16 according to the first embodiment. FIG. 4 is a schematic configuration diagram of another state in the method for injecting the adhesive 16 according to the first embodiment. FIGS. 3 and 4 are schematics viewed from the A-A direction in FIG. 1. The following describes the method for injecting the adhesive 16 according to the first embodiment with reference to FIGS. 1 to 4. As illustrated in FIG. 2, the method for injecting the adhesive 16 includes a positioning step (Step S12), a sealing material disposing step (Step S14), and an injecting step (Step S16).

First, the positions of the outer plate 12 and the reinforcing member 14 to be bonded by the adhesive 16 are determined (Step S12). Specifically, the position of the reinforcing member 14 with respect to the outer plate 12 is determined. More specifically, the positions of the bonding surface 14s of the reinforcing member 14 and the bonded surface 12s of the outer plate 12 facing the bonding surface 14s in the direction orthogonal thereto, the angle between the bonding surface 14s and the bonded surface 12s, and the space between the bonding surface 14s and the bonded surface 12s are determined. As a result, the adhesive injection area and the gaps are formed between the bonding surface 14s and the bonded surface 12s.

Subsequently, the sealing material (seal) 20 that covers the gaps is disposed (Step S14). Specifically, one side of the sealing material (seal) 20 is fixed to a predetermined position on the reinforcing member 14, and the other side thereof is fixed to a predetermined position on the outer plate 12. Other parts of the sealing material 20 are not necessarily fixed, or the whole part other than the part facing the gaps may be fixed. As a result, the adhesive injection area serves as a space with its gaps covered. As illustrated in FIG. 3, for example, the sealing pieces (seal members) 20a, 20b, 20c, and 20d are disposed at once to cover the gaps extending in the Z-direction.

Subsequently, the adhesive 16 before cured is successively injected into the through holes 18a to 18j from a first end in the −Z-direction to the second end in the +Z-direction using an adhesive injector 22 illustrated in FIG. 4 (Step S16). Specifically, the adhesive 16 is injected into the through hole 18a formed closest to the end in the −Z-direction. Subsequently, the adhesive 16 is injected into the through hole 18b formed second closest to the end in the −Z-direction. Similarly, the adhesive 16 is injected into the through holes 18c, 18d, 18e, 18f, 18g, 18h, 18i, and 18j in order. As a result, the adhesive 16 is successively injected into the adhesive injection area from the end in the −Z-direction to the end in the +Z-direction.

At Step S16, as illustrated in FIG. 4, while the adhesive 16 is being injected into a first through hole 18a, when the adhesive 16 can be recognized through a second through hole 18b formed adjacent to the first through hole 18a into which the adhesive 16 is being injected, the through hole into which the adhesive 16 is to be injected is shifted from the first through hole 18a to the second through hole 18b. As illustrated in FIG. 4, the stage when the adhesive 16 can be recognized through the through hole 18b indicates a stage when the adhesive 16 can be visually recognized through the second through hole 18b, that is, a stage when the adhesive 16 reaches the penetrating direction of the second through hole 18b. Alternatively, the stage when the adhesive 16 can be recognized through the second through hole 18b may be a stage when the adhesive 16 starts protruding from the second through hole 18b. At this stage, it is determined that injection of the adhesive 16 into the first through hole 18a is completed.

Similarly, at Step S16, the through hole into which the adhesive 16 is to be injected is shifted from the end in the −Z-direction to the end in the +Z-direction, that is, the through holes 18c, 18d, 18e, 18f, 18g, 18h, 18i, and 18j in order subsequently to the through holes 18a and 18b. As a result, the adhesive 16 is injected into the adhesive injection area from the end in the −Z-direction to the end in the +Z-direction.

At Step S16, when the adhesive 16 is being injected into the first through hole 18a, air bubbles are removed from the gaps on the end in the +Z-direction and the remaining through holes 18b to 18j into which the adhesive 16 has not yet been injected. When the adhesive 16 is being injected into the second through hole 18b, air bubbles are removed from the gaps on the end in the +Z-direction and the remaining through holes 18c to 18j into which the adhesive 16 is not injected. Similarly, when the adhesive 16 is being injected into any one of the through holes, air bubbles are removed from the gaps on the end in the +Z-direction and the through holes into which the adhesive 16 is not injected. As a result, the adhesive injection area is cleared of the air bubbles and filled with the adhesive 16.

After the adhesive 16 injected at Step S16 is solidified, the sealing material (seal) 20 may be removed from the gaps. In this case, the sealing material (seal) 20 can be reused.

The method for injecting the adhesive 16 according to the first embodiment has the configuration described above. Because the adhesive 16 is injected through the through holes 18a to 18j of the reinforcing member 14, air bubbles are removed from the end in the +Z-direction, the gaps, and the through holes into which the adhesive 16 is not injected. The adhesive 16 is checked through a through hole formed adjacent to a through hole into which the adhesive 16 is being injected. Consequently, the method enables checking that no air bubble remains in the adhesive injection area when the adhesive 16 is injected, reducing the number of air bubbles included in the adhesive 16, and suppressing reduction in the bonding strength between the composite materials.

The method for injecting the adhesive 16 according to the first embodiment includes the sealing material (seal) disposing step, which is processing of disposing the sealing material 20 that covers the gaps. Consequently, the method can prevent the adhesive 16 from flowing out through the gaps, thereby precisely forming the injected adhesive 16 within the adhesive injection area.

In the method for injecting the adhesive 16 according to the first embodiment, the bonding surface 14s extends in the Z-direction, and the through holes 18a to 18j are formed in a pair of two columns extending in the Z-direction in a staggered manner. Consequently, the method requires the bonding surface 14s with a smaller area and a smaller number of through holes 18a to 18j and can increase the reinforcing effect of the reinforcing member 14.

In the method for injecting the adhesive 16 according to the first embodiment, the through holes 18a to 18j are formed in a pair of two columns extending in the Z-direction in a staggered manner with the web 15b sandwiched therebetween in the flange 15a. Consequently, the method requires the bonding surface 14s with a smaller area and a smaller number of through holes 18a to 18j and can increase the reinforcing effect of the reinforcing member 14.

The method for injecting the adhesive 16 according to the first embodiment may perform the processing at Step S14 corresponding to the state at Step S16. Specifically, at Step S14, the sealing pieces (seal members) are disposed in order from the end in the −Z-direction to the end in the +Z-direction. In other words, the seal member 20a and the seal member 20c are disposed in order at the gap on the first side, and the seal member 20b and the seal member 20d are disposed in order at the gap on the second side. At Step S14, the sealing pieces 20a and 20b at the end in the −Z-direction are disposed first. Preferably, before the adhesive 16 injected at Step S16 protrudes beyond the range of the sealing pieces 20a and 20b disposed first, the sealing pieces 20c and 20d are additionally disposed adjacent to the sealing pieces 20a and 20b, respectively, at the end in the +Z-direction. Alternatively, after a slight amount of the adhesive 16 protrudes, the sealing pieces 20c and 20d may be added and disposed adjacent to the sealing pieces 20a and 20b, respectively, at the end in the +Z-direction. If the adhesive injection area further extends in the Z-direction, additional sealing pieces are successively added and disposed at the end in the +Z-direction corresponding to the range of the adhesive 16 injected at Step S16 reaching in the +Z-direction.

If the sealing pieces are added and disposed in order from the end in the −Z-direction to the end in the +Z-direction at Step S14 corresponding to the state at Step S16, the method for injecting the adhesive 16 according to the first embodiment does not excessively cover, with the sealing material 20, an area into which the adhesive 16 is not injected and keeps the gaps open. Consequently, the method can maintain the state of being capable of removing air bubbles from the end in the +Z-direction corresponding to an injection state of the adhesive 16.

If the sealing material (seal) extends toward the through holes 18a to 18j, the method for injecting the adhesive 16 according to the first embodiment is preferably employed because the through holes 18a to 18j can be covered with the portion of the sealing material extending toward the through holes 18a to 18j after the adhesive 16 is injected thereinto at Step S16.

In a case where the sealing material (seal) has through holes, the method for injecting the adhesive 16 according to the first embodiment successively uses the through holes formed in the reinforcing member 14 and the through holes formed in the sealing material to remove air bubbles, check that no air bubble remains, and inject the adhesive 16 at Step S16. Consequently, the method requires a smaller number of through holes formed in the reinforcing member 14, thereby further increasing the reinforcing effect of the reinforcing member 14. In the case where the sealing material (seal) has through holes, and the reinforcing member 14 has no through hole, the method for injecting the adhesive 16 according to the first embodiment successively uses the through holes formed in the sealing material to remove air bubbles, check that no air bubble remains, and inject the adhesive 16 at Step S16. Consequently, the method requires no through hole formed in the reinforcing member 14, thereby further increasing the reinforcing effect of the reinforcing member 14.

Second Embodiment

Figure 5:
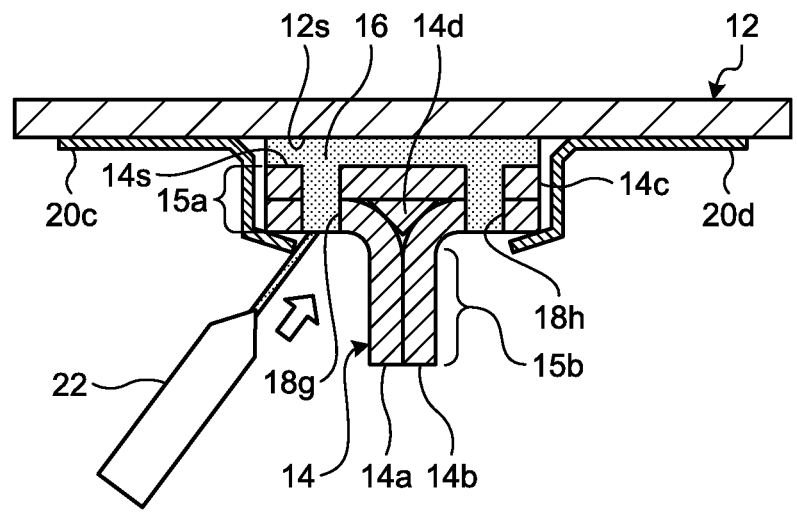
FIG. 5 is a schematic configuration diagram of one state in the method for injecting the adhesive according to a second embodiment.
Figure 6:
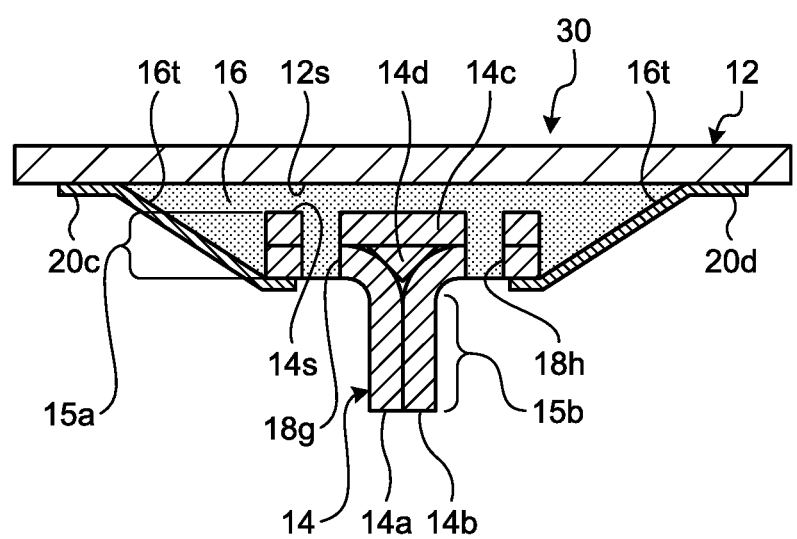
FIG. 6 is a schematic configuration diagram of the structure of the composite materials and another state in the method for injecting the adhesive according to the second embodiment.

FIG. 5 is a schematic configuration diagram of one state in the method for injecting the adhesive 16 according to a second embodiment. FIG. 6 is a schematic configuration diagram of a structure 30 of the composite materials and another state in the method for injecting the adhesive 16 according to the second embodiment. FIGS. 5 and 6 are schematics viewed from a section direction corresponding to a direction of the B-B section in FIG. 1. The B-B section is a plane connecting two sections along a plane direction orthogonal to the Z-direction between the members 14a and 14b discontinuously. The B-B section passes through the center of the through hole 18g in the member 14a and passes through the center of the through hole 18h in the member 14b. The structure 30 is different from the structure 10 in that tapered portions 16t are formed at the gap portions of the adhesive 16. The method for injecting the adhesive 16 according to the second embodiment is different from the method for injecting the adhesive 16 according to the first embodiment in that the tapered portions 16t are formed at the gap portions of the injected adhesive 16 by the sealing material (seal) 20. In the description of the second embodiment, components similar to those of the first embodiment are denoted by like reference numerals, and detailed explanation thereof is omitted.

As illustrated in FIG. 6, the structure 30 includes the outer plate 12, the reinforcing member 14, and the adhesive 16. The adhesive 16 has the tapered portions 16t tapering from the reinforcing member 14 to the outer plate 12 and formed at the gap portions, that is, the portions exposed from the outer plate 12 and the reinforcing member 14. The tapered portions 16t each cover the side surface of the flange 15a of the reinforcing member 14 on the gap side and have a tapered shape tapering from the surface of the flange 15a of the reinforcing member 14 on the web 15b side to the bonded surface 12s of the outer plate 12. In other words, the portions of the adhesive 16 protruding from the respective gaps serve as the tapered portions 16t having a tapered shape the thickness of which becomes thinner from the reinforcing member 14 toward the outer plate 12.

As illustrated in FIG. 6, the structure 30 may include the sealing material (seal) 20 that covers the gaps formed on both sides of the bonding surface 14s. The sealing material (seal) 20 included in the structure 30 extends along the tapered portions 16t.

In a case where the sealing material 20 is a tape-like member made of a flexible material, portions of the sealing material 20 facing the respective tapered portions 16t change their shapes to correspond to the respective tapered portions 16t in such a manner to swell into a tapered shape tapering from the reinforcing member 14 to the outer plate 12 toward the outside of the gaps. Alternatively, the sealing material 20 may change its shape in such a manner to swell into a tapered shape tapering from the reinforcing member 14 to the outer plate 12 toward the outside of the gaps while being separated from the tapered portions 16t.

In a case where the sealing material 20 is a dam member made of a rigid material, the inside portions of the sealing material 20 facing the respective tapered portions 16t are formed in a tapered shape corresponding to the respective tapered portions 16t from the reinforcing member 14 to the outer plate 12.

The structure 30 has the configuration described above. Because the adhesive 16 includes the tapered portions 16t formed in a tapered shape tapering from the reinforcing member 14 to the outer plate 12, the structure 30 has higher resistance to external stress at the gap portions of the adhesive 16.

In the conventional structures 100 and 110 of the composite materials, the injected liquid adhesive 106 protrudes from the gaps, thereby deforming. As a result, the bonding strength between the outer plate 102 and the reinforcing member 104 is reduced. By contrast, the structure 30 includes the sealing material 20, thereby suppressing protrusion of the injected adhesive 16 from the gaps and deformation of the adhesive 16. Consequently, the structure 30 can stabilize the quality of the tapered portions 16t and suppress reduction in the bonding strength between the outer plate 12 and the reinforcing member 14. In addition, the structure 30 requires less work to form the tapered portions 16t.

Similarly to the method for injecting the adhesive 16 according to the first embodiment, the method for injecting the adhesive 16 according to the second embodiment includes the positioning step (Step S12), the sealing material disposing step (Step S14), and the injecting step (Step S16). Step S12 in the method for injecting the adhesive 16 according to the second embodiment is the same as that according to the first embodiment.

Step S14 in the method for injecting the adhesive 16 according to the second embodiment is different from that according to the first embodiment in the way of disposing the sealing material (seal) 20 in detail. Specifically, at Step S14 in the method for injecting the adhesive 16 according to the second embodiment, one side of the sealing material (seal) 20 is fixed to a predetermined position on the reinforcing member 14, and the other side thereof is fixed to a predetermined position on the outer plate 12. In addition, other parts of the sealing material 20 are disposed so as to form the gap portions of the adhesive 16 into the tapered portions 16t.

Specifically, in a case where the sealing material (seal) 20 is a tape-like member made of a flexible material, at Step S14 in the method for injecting the adhesive 16 according to the second embodiment, the parts of the sealing material (seal) 20 facing the gap portions are not fixed. The parts are capable of changing their shapes in such a manner to swell into a tapered shape tapering from the reinforcing member 14 to the outer plate 12 toward the outside of the gaps as the adhesive 16 is injected.

In a case where the sealing material (seal) 20 is a dam member made of a rigid material, at Step S14 in the method for injecting the adhesive 16 according to the second embodiment, the inside portions of the sealing material 20 facing the gap portions are formed in a tapered shape corresponding to the respective tapered portions 16t from the reinforcing member 14 to the outer plate 12.

Step S16 in the method for injecting the adhesive 16 according to the second embodiment is different from that according to the first embodiment in that it further includes forming the tapered portions 16t at the respective gap portions of the adhesive 16. Specifically, at Step S16 in the method for injecting the adhesive 16 according to the second embodiment, the tapered portions 16t are formed at the portions of the sealing material 20 facing the respective gaps, that is, at the respective gap portions of the adhesive 16.

Specifically, in a case where the sealing material 20 is a tape-like member made of a flexible material, at Step S16 in the method for injecting the adhesive 16 according to the second embodiment, the sealing material 20 changes its shape in such a manner to swell toward the outside of the gaps as illustrated in FIG. 6 from the state illustrated in FIG. 5 as the adhesive 16 is injected. As a result, the gap portions of the adhesive 16 swell in a protruding manner larger than the respective tapered portions 16t by the sealing material 20. Subsequently, the adhesive 16 shrinks as it cures, thereby forming the gap portions into the tapered portions 16t.

In a case where the sealing material 20 is a dam member made of a rigid material, at Step S16 in the method for injecting the adhesive 16 according to the second embodiment, the injected adhesive 16 is formed into a shape extending along the inside portion of the sealing material 20 facing the respective gap portions as illustrated in FIG. 6. Subsequently, the adhesive 16 cures, thereby forming the gap portions into the tapered portions 16t.

The method for injecting the adhesive 16 according to the second embodiment has the configuration described above. The method suppresses protrusion of the injected adhesive 16 from the gaps and deformation of the adhesive 16 with the sealing material 20. Consequently, the method can stabilize the quality of the tapered portions 16t and suppress reduction in the bonding strength between the outer plate 12 and the reinforcing member 14. In addition, the method requires less work to form the tapered portions 16t.

In a case where the sealing material 20 is a tape-like member made of a flexible material, the method for injecting the adhesive 16 according to the second embodiment can form the gap portions of the adhesive 16 into a desired tapered shape using shrinkage of the adhesive 16 accompanying curing.

In a case where the sealing material 20 is a dam member made of a rigid material, the method for injecting the adhesive 16 according to the second embodiment can form the gap portions of the adhesive 16 into a desired tapered shape corresponding to the shape of the inside portion of the dam member.

Third Embodiment

Figure 7:
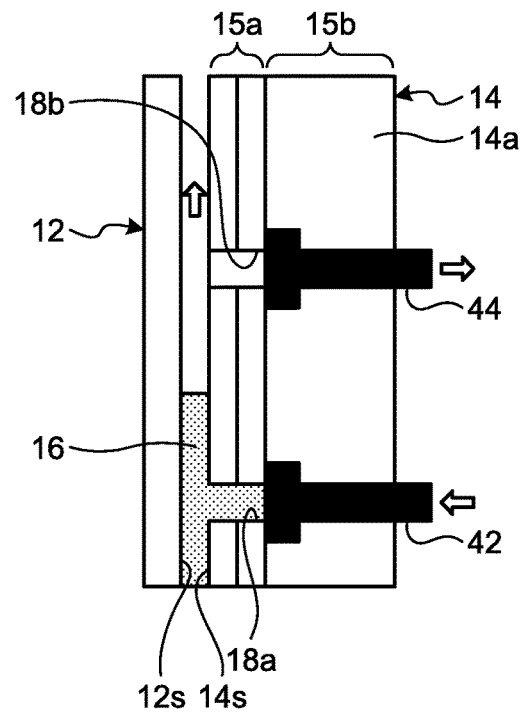
FIG. 7 is a schematic configuration diagram of one state in the method for injecting the adhesive according to a third embodiment.
Figure 8:
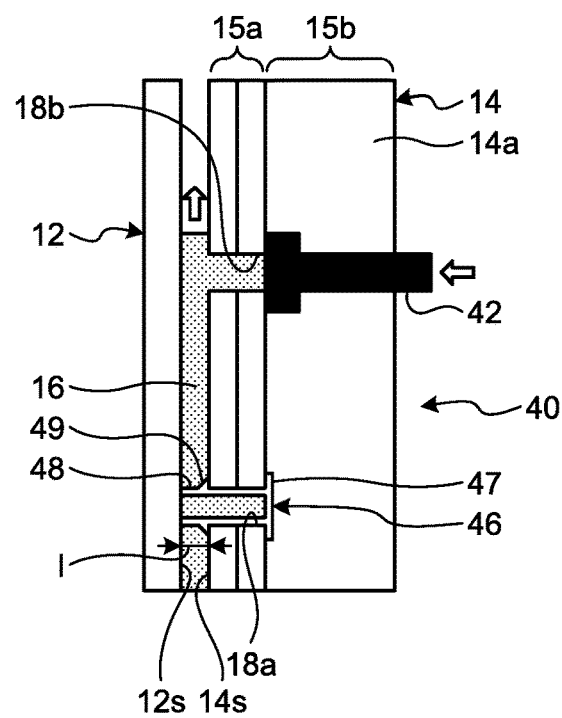
FIG. 8 is a schematic configuration diagram of the structure of the composite materials and another state in the method for injecting the adhesive according to the third embodiment.
Figure 9:
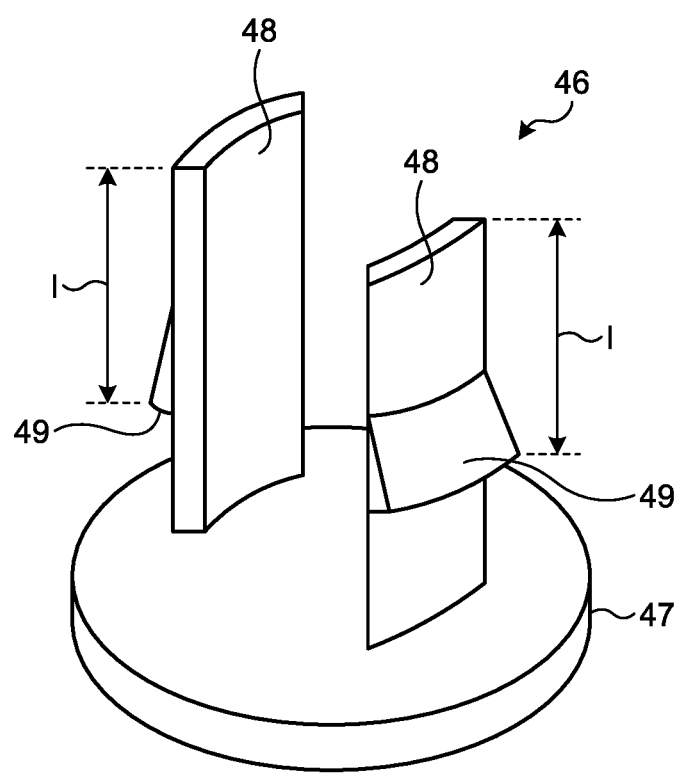
FIG. 9 is a schematic configuration diagram of a lid member included in the structure of the composite materials according to the third embodiment.
Figure 10:
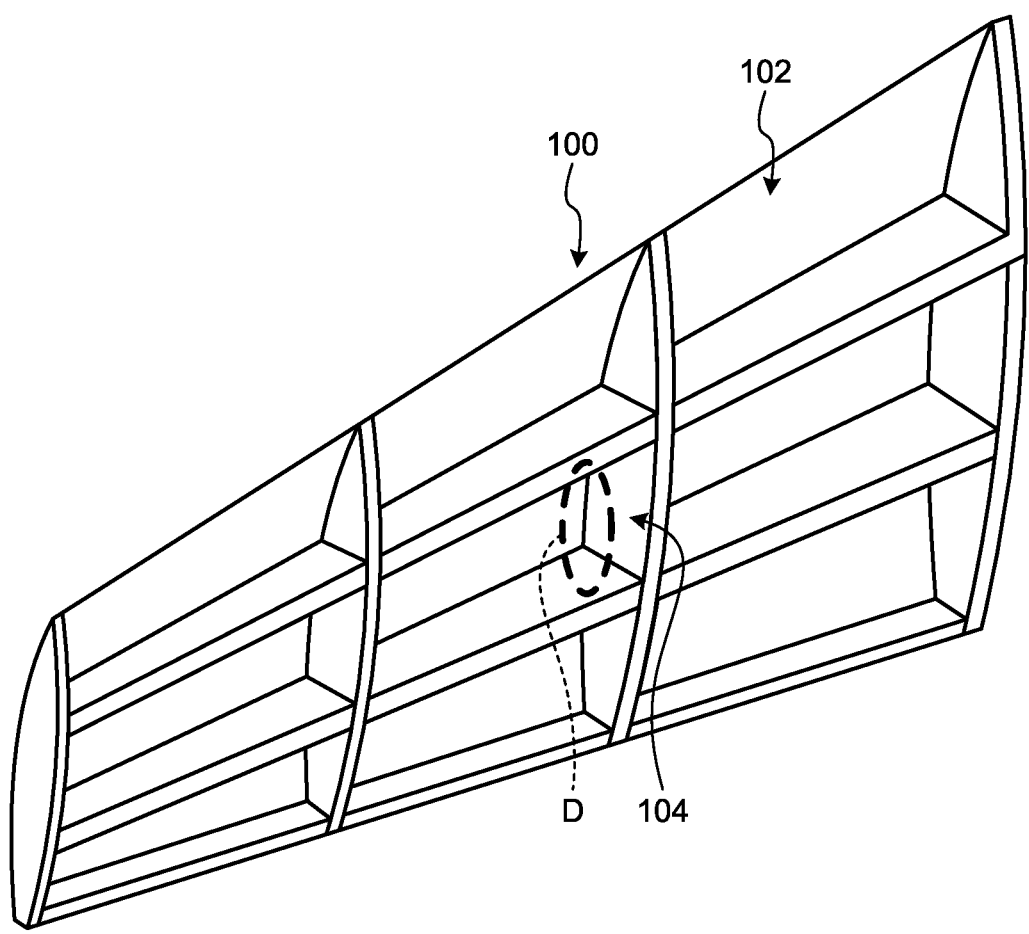
FIG. 10 is a schematic of a conventional structure of composite materials.

FIG. 7 is a schematic configuration diagram of one state in the method for injecting the adhesive 16 according to a third embodiment. FIG. 8 is a schematic configuration diagram of a structure 40 of the composite materials and another state in the method for injecting the adhesive 16 according to the third embodiment. FIG. 9 is a schematic configuration diagram of a lid member 46 included in the structure 40 of the composite materials according to the third embodiment. FIGS. 7 and 8 are schematics viewed from a section direction corresponding to a direction of the C-C section in FIG. 1. The C-C section is a plane orthogonal to the outer plane 12 and connecting two sections along the Z-direction. One of the sections passes through the center of the through hole 18a, and the other thereof passes through the center of the through hole 18b. FIGS. 7 and 8 do not illustrate the area positioned in the +Z-direction with respect to the through hole 18c.

The structure 40 is different from the structure 10 in that it further includes the lid member 46 attached to a through hole. The method for injecting the adhesive 16 according to the third embodiment is different from the method for injecting the adhesive 16 according to the first embodiment in that it further includes performing suction through a through hole formed adjacent to a through hole into which the adhesive 16 is being injected and attaching the lid member 46 to a through hole on which injection of the adhesive 16 is completed. In the description of the third embodiment, components similar to those of the first embodiment are denoted by like reference numerals, and detailed explanation thereof is omitted.

As illustrated in a part closer to the end in the −Z-direction in FIG. 8, the structure 40 includes the outer plate 12, the reinforcing member 14, the adhesive 16, and the lid member 46. The lid member 46 is attached to the through hole 18a in FIG. 8. The lid members 46 may be attached to all or some of the through holes 18a to 18j.

As illustrated in FIG. 9, the lid member 46 includes a lid body 47, protrusions 48, and stoppers 49. The lid member 46 integrates the lid body 47, the protrusions 48, and the stoppers 49 and may be made of the same material as that of the adhesive 16. The lid body 47 is a disc-like plate that covers a through hole and has a diameter larger than that of the through hole. The lid body 47 is not limited to a disk-like plate and may have any desired shape as long as it is a plate having a size large enough to sufficiently cover the through hole. The protrusions 48 extend in a protruding manner in a direction from the lid body 47 toward the outer plate 12. The stoppers 49 prevent the lid member 46 from coming off from the through hole. The stoppers 49 are each provided at a position of a predetermined length l from the front end of the protrusion 48 toward the lid body 47. As illustrated in FIG. 8, the predetermined length l keeps the gap between the bonded surface 12s of the outer plate 12 and the bonding surface 14s of the reinforcing member 14, that is, the width of the adhesive injection area and the thickness of the adhesive 16 at a length defined based on the predetermined length l.

In a case where the lid member 46 is attached perpendicularly to the bonded surface 12s, the predetermined length l is equal to the gap between the bonded surface 12s of the outer plate 12 and the bonding surface 14s of the reinforcing member 14, that is, the width of the adhesive injection area and the thickness of the adhesive 16. In contrast, in a case where the lid member 46 is attached obliquely to the bonded surface 12s, the relation between the predetermined length l and the gap between the bonded surface 12s of the outer plate 12 and the bonding surface 14s of the reinforcing member 14, that is, the width of the adhesive injection area and the thickness of the adhesive 16 is determined based on the attachment angle.

The lid member 46 does not necessarily have the shape described above. The lid member, for example, may include one or a plurality of needle members provided to the lid body 47 and capable of being stuck and inserted into the injected adhesive 16. In this case, the needle member of the lid member preferably has a stopper that prevents the lid member from coming off from the through hole. The stopper is preferably provided at a position of the predetermined length l from the front end of the needle member toward the lid body 47. With this structure, the thickness of the adhesive 16 can be kept at a length defined based on the predetermined length l.

Alternatively, the lid member may include one or a plurality of spring members provided to the lid body 47 and capable of being inserted into the injected adhesive 16. In this case, the spring member of the lid member preferably has a stopper that prevents the lid member from coming off from the through hole. The stopper is preferably provided at a position of the predetermined length l from the front end of the spring member toward the lid body 47. With this structure, the thickness of the adhesive 16 can be kept at a length defined based on the predetermined length l.

The structure 40 has the configuration described above. Consequently, the structure 40 can prevent the adhesive 16 from leaking from the through holes to which the lid members 46 are attached. In addition, the structure 40 can prevent the lid members 46 from coming off from the through holes and keep the thickness of the adhesive 16 at a length defined based on the predetermined length l.

Similarly to the method for injecting the adhesive 16 according to the first embodiment, the method for injecting the adhesive 16 according to the third embodiment includes the positioning step (Step S12), the sealing material disposing step (Step S14), and the injecting step (Step S16). Step S12 and Step S14 in the method for injecting the adhesive 16 according to the third embodiment are the same as those according to the first embodiment.

Step S16 in the method for injecting the adhesive 16 according to the third embodiment is different from that according to the first embodiment in that it further includes performing suction through a through hole formed adjacent to a through hole into which the adhesive 16 is being injected and attaching the lid member 46 to a through hole on which injection of the adhesive 16 is completed.

At Step S16 in the method for injecting the adhesive 16 according to the third embodiment, the adhesive 16 before cured is successively injected into the through holes 18a to 18j from the end in the −Z-direction to the end in the +Z-direction using an adhesive injector 42 illustrated in FIGS. 7 and 8. Simultaneously with the injection, at Step S16 in the method for injecting the adhesive 16 according to the third embodiment, suction is successively performed through the through holes 18b to 18j from the end in the −Z-direction to the end in the +Z-direction with a sucker 44 illustrated in FIG. 7.

Specifically, at Step S16 in the third embodiment, the adhesive 16 according to the third embodiment, the adhesive 16 is injected into the through hole 18a formed closest to the end in the −Z-direction as illustrated in FIG. 7. Simultaneously with this, suction is performed through the through hole 18b formed adjacent to the through hole 18a. At this time, only air bubbles or a mixture of the adhesive 16 and air bubbles are sucked through the through hole 18b. When the adhesive 16 with no air bubble starts to be sucked through the through hole 18b, it can be determined that the portion closer to the end in the −Z-direction than the through hole 18b is filled with the adhesive 16. Consequently, it is determined that the adhesive 16 can be recognized through the through hole 18b formed adjacent to the through hole 18a into which the adhesive 16 is being injected when the adhesive 16 is being injected into the through hole 18a. In other words, it is determined that injection of the adhesive 16 into the through hole 18a is completed. At this stage, the through hole into which the adhesive 16 is to be injected is shifted from the through hole 18a to the through hole 18b. Simultaneously with this, the through hole through which suction is to be performed is shifted from the through hole 18b to the through hole 18c.

At Step S16 in the method for injecting the adhesive 16 according to the third embodiment, the lid member 46 is attached to the through hole 18a on which injection of the adhesive 16 is completed after the through hole into which the adhesive 16 is to be injected is shifted from the through hole 18a to the through hole 18b and before the adhesive 16 sufficiently cures.

Similarly, at Step S16 in the method for injecting the adhesive 16 according to the third embodiment, the through hole into which the adhesive 16 is to be injected is shifted from the end in the −Z-direction to the end in the +Z-direction, that is, the through holes 18c, 18d, 18e, 18f, 18g, 18h, and 18i in order subsequently to the through holes 18a and 18b. Simultaneously with this, the through hole through which suction is to be performed is shifted from the end in the −Z-direction to the end in the +Z-direction, that is, the through holes 18d, 18e, 18f, 18g, 18h, 18i, and 18j in order subsequently to the through holes 18b and 18c. As the through hole into which the adhesive 16 is to be injected is shifted, the lid members 46 are successively attached to the through holes 18b to 18i on which injection of the adhesive 16 is completed.

At Step S16 in the method for injecting the adhesive 16 according to the third embodiment, when injection of the adhesive 16 into the through hole 18i is completed, the through hole into which the adhesive 16 is to be injected is shifted to the through hole 18j, and suction performed through the through hole is finished. When injection of the adhesive 16 into the through hole 18j is completed, and the lid member 46 is attached to the through hole 18j on which injection of the adhesive 16 is completed, Step S16 in the method for injecting the adhesive 16 according to the third embodiment is finished. As a result, the adhesive 16 is injected into the adhesive injection area from the end in the −Z-direction to the end in the +Z-direction.

At Step S16 in the method for injecting the adhesive 16 according to the third embodiment, when the adhesive 16 is being injected into the through hole 18a, air bubbles are removed from the gaps on the end in the +Z-direction and the through holes 18c to 18j into which the adhesive 16 is not injected. In addition, the air bubbles are actively sucked and removed through the through hole 18b. When the adhesive 16 is being injected into the through hole 18b, air bubbles are removed from the gaps on the end in the +Z-direction and the through holes 18d to 18j into which the adhesive 16 is not injected. In addition, the air bubbles are actively sucked and removed through the through hole 18c. Similarly, except when the adhesive 16 is being injected into the through hole 18j formed closest to the end in the +Z-direction, air bubbles are actively sucked and removed through a through hole formed adjacent to a through hole into which the adhesive 16 is being injected. As a result, the adhesive injection area is cleared of the air bubbles more reliably and filled with the adhesive 16.

At Step S16 in the method for injecting the adhesive 16 according to the third embodiment, the lid members 46 may be attached to all or some of the through holes 18a to 18j. At Step S16 in the method for injecting the adhesive 16 according to the third embodiment, the lid member 46 is attached to at least one through hole. Consequently, the method can prevent the adhesive 16 from leaking from the through holes to which the lid members 46 are attached. In addition, the method can prevent the lid members 46 from coming off from the through holes and keep the thickness of the adhesive 16 at the predetermined length l.

The method for injecting the adhesive 16 according to the third embodiment has the configuration described above. The adhesive 16 is checked based on the state of suction performed through a through hole formed adjacent to a through hole into which the adhesive 16 is being injected.

Consequently, the method enables checking that no air bubble remains in the adhesive injection area when the adhesive 16 is injected. Furthermore, air bubbles are removed by suction. Consequently, the method enables further reducing the number of air bubbles included in the adhesive 16 and suppressing reduction in the bonding strength between the composite materials.

In the method for injecting the adhesive 16 according to the third embodiment, the lid member 46 is attached to a through hole on which injection of the adhesive 16 is completed. Consequently, the method can prevent the adhesive 16 from leaking from the through hole on which injection of the adhesive 16 is completed.

In the method for injecting the adhesive 16 according to the third embodiment, the lid member 46 attached to a through hole on which injection of the adhesive 16 is completed has the stoppers 49. Consequently, the method can prevent the lid member 46 from coming off from the through hole. In the method for injecting the adhesive 16 according to the third embodiment, the stoppers 49 are each provided at a position of the predetermined length l from the front end of the protrusion 48 toward the lid body 47 in the lid member 46 attached to the through hole on which injection of the adhesive 16 is completed. Consequently, the method can keep the thickness of the adhesive 16 at a length defined based on the predetermined length l.

REFERENCE SIGNS LIST 10, 30, 40, 100, 110 structure
12, 102 outer plate
12s, 102s bonded surface
14, 104 reinforcing member
14a, 14b, 14c, 14d member
14s, 104s bonding surface
15a flange
15b web
16, 106 adhesive
16t, 106t tapered portion
18a, 18b, 18c, 18d, 18e, 18f, 18g, 18h, 18i, 18j through hole
20 sealing material
20a, 20b, 20c, 20d sealing piece
22, 42, 122 adhesive injector
44 sucker
46 lid member
47 lid body
48 protrusion
49 stopper
107 air bubble
112 taper former

The invention claimed is:

1. An adhesive injection method for injecting an adhesive for bonding an outer plate and a reinforcing member, the reinforcing member having a plurality of through holes bored through the reinforcing member in a direction intersecting a bonding surface facing the outer plate, the adhesive injection method comprising:
    positioning the outer plate and the reinforcing member;
    arranging a seal to cover a gap between the outer plate and the reinforcing member; and
    injecting the adhesive into the through holes in order from a first end to a second end of the bonding surface; and
    removing the seal after solidification of the adhesive,
    wherein during the injecting, while the adhesive is injected into a first one of the through holes, when the adhesive appears through a second one of the through holes adjacent to the first one of the through holes into which the adhesive is being injected, a location at which the adhesive is to be injected is shifted from the first one of the through holes into which the adhesive is being injected to the second one of the through holes, and
    wherein the seal is a separate and discrete element with respect to the adhesive, and is configured to shape any adhesive protruding from the gap between the outer plate and the reinforcing member.

2. The adhesive injection method according to claim 1, wherein the seal is configured to form the adhesive injected during the injecting into a tapered shape tapering from the reinforcing member to the outer plate.

3. The adhesive injection method according to claim 2, wherein the seal is flexible to change a shape to swell toward an outside of the gap as the adhesive is injected during the injecting.

4. The adhesive injection method according to claim 2, wherein the seal is a dam member which is a rigid body, and an inside of the dam member being formed in a tapered shape tapering from the reinforcing member to the outer plate.

5. The adhesive injection method according to claim 1, wherein:
    the seal includes a plurality of divided seal members, and
    the seal members are arranged in order from the first end to the second end of the bonding surface, and
    before the adhesive injected during the injecting protrudes beyond a range of a first one of the seal members arranged in place, a second one of the seal members is additionally arranged.

6. The adhesive injection method according to claim 1, wherein, during the injecting,
    suction is performed through the second one of the through holes formed adjacent to the first one of the through holes, and
    when the adhesive appears through the second one of the through holes formed adjacent to the first one of the through holes into which the adhesive is being injected, a suction location through which suction is to be performed is shifted from the second one of the through holes through which the suction is being performed to a third one of the through holes formed adjacent to the second one of the through holes through which the suction is being performed.

7. The adhesive injection method according to claim 1, wherein, during the injecting, a lid member is attached to the first one of the through holes into which injection of the adhesive has been completed.

8. The adhesive injection method according to claim 7, wherein
    the lid member comprises:
        a lid body covering the first one of the through holes;
        a protrusion extending in a protruding manner in a direction from the lid body toward the outer plate; and
        a stopper located at a position of a predetermined length from a front end of the protrusion toward the lid body and configured to prevent the lid member from coming off from the first one of the through holes, and
    wherein the lid member is configured to keep the thickness of the adhesive at a length defined based on the predetermined length.

9. The adhesive injection method according to claim 1, wherein:

the bonding surface extends in a certain direction, the through holes are formed in a pair of columns extending in the certain direction in a staggered manner, and the seal extends in the certain direction and covers the gap formed on both sides of the joint between the outer plate and the reinforcing member.

10. The adhesive injection method according to claim 9, wherein the reinforcing member comprises:

a flange extending in a direction along the bonding surface; and a web extending in a direction intersecting the bonding surface and in the certain direction, and the through holes are formed in a pair of two columns in a staggered manner with the web sandwiched therebetween.

11. An adhesive injection method for injecting an adhesive for bonding an outer plate and a reinforcing member, the reinforcing member having a plurality of through holes bored through the reinforcing member in a direction intersecting a bonding surface facing the outer plate, the adhesive injection method comprising:

positioning the outer plate and the reinforcing member;

arranging a seal to cover a gap between the outer plate and the reinforcing member; and injecting the adhesive into the through holes in order from a first end to a second end of the bonding surface, wherein during the injecting, while the adhesive is injected into a first one of the through holes, when the adhesive appears through a second one of the through holes adjacent to the first one of the through holes into which the adhesive is being injected, a location at which the adhesive is to be injected is shifted from the first one of the through holes into which the adhesive is being injected to the second one of the through holes, wherein, during the injecting, a lid member is attached to the first one of the through holes into which injection of the adhesive has been completed, the lid member including:

a lid body covering the first one of the through holes;

a protrusion extending in a protruding manner in a direction from the lid body toward the outer plate; and a stopper located at a position of a predetermined length from a front end of the protrusion toward the lid body and and configured to prevent the lid member from coming off from the first one of the through holes, and wherein the lid member is configured to keep the thickness of the adhesive at a length defined based on the predetermined length.

12. An adhesive injection method for injecting an adhesive for bonding an outer plate and a reinforcing member, the reinforcing member having a plurality of through holes bored through the reinforcing member in a direction intersecting a bonding surface facing the outer plate, the adhesive injection method comprising:

positioning the outer plate and the reinforcing member;

arranging a seal to cover a gap between the outer plate and the reinforcing member; and injecting the adhesive into the through holes in order from a first end to a second end of the bonding surface, wherein during the injecting, while the adhesive is injected into a first one of the through holes, when the adhesive appears through a second one of the through holes adjacent to the first one of the through holes into which the adhesive is being injected, a location at which the adhesive is to be injected is shifted from the first one of the through holes into which the adhesive is being injected to the second one of the through holes, wherein the seal is a separate and discrete element with respect to the adhesive, and is configured to shape any adhesive protruding from the gap between the outer plate and the reinforcing member, wherein the seal is configured to form the adhesive injected during the injecting into a tapered shape tapering from the reinforcing member to the outer plate, and wherein the seal is a dam member which is a rigid body, and an inside of the dam member being formed in a tapered shape tapering from the reinforcing member to the outer plate.

* * * * *